(No Model.)
J. F. M. MORSE.
NUT LOCK.
No. 334,031. Patented Jan. 12, 1886.
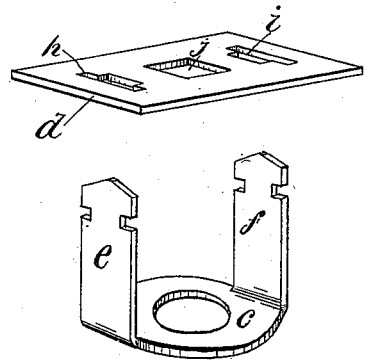
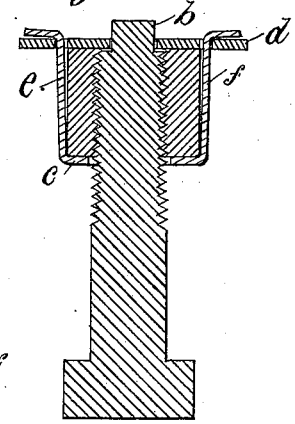
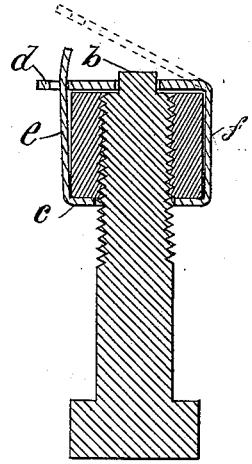
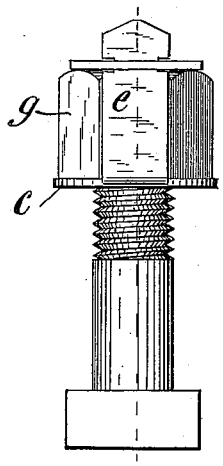
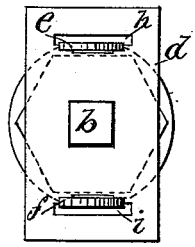
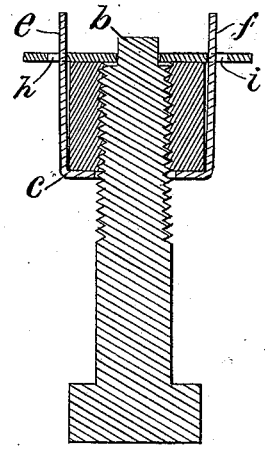
WITNESSES:
M. Carsten
Frank A. Jacob
INVENTOR:
James F. M. Morse.
By H. P. Hood
Atty.

UNITED STATES PATENT OFFICE.

JAMES F. M. MORSE, OF EVANSVILLE, INDIANA.

NUT-LOCK.

SPECIFICATION forming part of Letters Patent No. 334,031, dated January 12, 1886.

Application filed June 26, 1885. Serial No. 169,538. (No model.)

*To all whom it may concern:*

Be it known that I, JAMES F. M. MORSE, a citizen of the United States, residing at Evansville, in the county of Vanderburg and State of Indiana, have invented a new and useful Improvement in Nut-Locks, of which the following is a specification.

My invention relates to an improvement in that class of nut-locks that admit of the frequent adjustment of the nut without injury to the lock.

The accompanying drawings illustrate my invention.

Figure 1 represents a side elevation of a bolt and nut with my nut-lock attached; Fig. 2, an end view of the same, and Fig. 3 a central longitudinal section at a right angle to Fig. 1. Fig. 4 is a view in perspective of the parts of the lock separated. Figs. 5 and 6 represent modifications of my device.

A short portion, *b*, of the outer end of the bolt is reduced and made angular in section.

*c* is a washer adapted to pass over the bolt and to embrace the nut on two sides.

*d* is a flat plate having a central perforation, *j*, corresponding in size and outline to the angular portion *b* of the bolt, and adapted to interlock with the projecting ends of the washer *c*.

In Figs. 1, 2, 3, and 4 the washer *c* is provided with arms *e* and *f*, which lie normally close along two opposite sides of the nut *g*, and project outward beyond the face of the nut. These projecting ends of arms *e* and *f* are notched on each edge, so as to form T-shaped heads, which pass through corresponding slots, *h* and *i*, in plate *d*, and engage the plate on the outside.

In operation, the nut is placed between the arms of washer *c*, and is then screwed onto the bolt, the washer turning with the nut. When the nut has been screwed down sufficiently, plate *d* is slipped over the projecting ends of arms *e* and *f* and the squared portion *b* of the bolt, the arms being forced slightly apart, so as to enter the wider portion of the slots in the plate, and then springing toward each other into the narrower portion of the slots when the plate has reached the notched portion of the arms. The nut is thus held in position by the engagement of the arms with the plate, which is held in a fixed relation with the bolt by the engagement of its central hole, *j*, with the squared portion of the bolt. When the nut is to be again turned, it is only necessary to release the hold of the arms upon plate *d*, when the plate may be removed.

In the modification of my device shown in Fig. 5 the ends of arms *e* and *f*, instead of being notched to engage with the plate *d*, are simply bent outward, as shown, thus retaining the plate on the bolt.

In Fig. 6 the plate *d* is shown as formed integral with one of the arms of the washer *c*, and interlocked with the other arm. In this case, when the nut is to be turned, the plate is bent outward, as indicated by dotted lines.

I claim as my invention—

1. The combination, with a bolt having the extreme end of its threaded portion angular in section, and a nut adapted to be screwed on said bolt, of a washer having a pair of arms adapted to embrace and to extend beyond the face of said nut, and a plate having a central perforation adapted to engage the said angular portion of the bolt and arranged to interlock with the arms of the washer, all arranged to co-operate substantially as and for the purpose specified.

2. The combination, with a bolt having an angular portion, *b*, and a nut, *g*, of washer *c*, having arms *e* and *f*, and plate *d*, having perforation *j*, and slots *h* and *i*, said plate being arranged to engage portion *b* of the bolt and to interlock with arms *e* and *f* of the washer, substantially as and for the purpose specified.

JAS. F. M. MORSE.

Witnesses:
D. P. SANDERSON,
H. S. PUTNAM.